(12) United States Patent
Kojima

(10) Patent No.: US 12,081,673 B2
(45) Date of Patent: Sep. 3, 2024

(54) USER AUTHENTICATION SYSTEM, USER AUTHENTICATION SERVER, AND USER AUTHENTICATION METHOD

(71) Applicant: CSE Co., Ltd., Tokyo (JP)

(72) Inventor: Takashi Kojima, Tokyo (JP)

(73) Assignee: CSE CO., LTD., Tokyo (JP)

( * ) Notice: Subject to any disclaimer, the term of this patent is extended or adjusted under 35 U.S.C. 154(b) by 337 days.

(21) Appl. No.: 17/288,236

(22) PCT Filed: Oct. 22, 2020

(86) PCT No.: PCT/JP2020/039694
§ 371 (c)(1),
(2) Date: Sep. 9, 2022

(87) PCT Pub. No.: WO2021/106445
PCT Pub. Date: Jun. 3, 2021

(65) Prior Publication Data
US 2023/0216686 A1    Jul. 6, 2023

(30) Foreign Application Priority Data
Nov. 28, 2019 (JP) .................. 2019-215185

(51) Int. Cl.
H04L 9/32          (2006.01)
G06F 21/36         (2013.01)
(52) U.S. Cl.
CPC ............ H04L 9/3228 (2013.01); G06F 21/36 (2013.01); H04L 9/3236 (2013.01)
(58) Field of Classification Search
CPC ...... H04L 9/3228; H04L 9/3236; G06F 21/36
(Continued)

(56) References Cited

U.S. PATENT DOCUMENTS 8,041,954 B2   10/2011   Plesman
8,947,197 B2*  2/2015    Craymer ............. G06Q 20/341
                                                    340/5.2
(Continued)

FOREIGN PATENT DOCUMENTS

JP    2007-264839 A    10/2007

OTHER PUBLICATIONS

Extended European Search Report in Europe Application No. 20861998.1, dated Apr. 4, 2022, 10 pages.
(Continued)

*Primary Examiner* — Teshome Hailu
(74) *Attorney, Agent, or Firm* — Crowell & Moring LLP

(57) ABSTRACT

A system which performs both identification and authentication of a user ID at the same time with only one step of inputting a one-time password without the need of step of inputting a user ID is provided. A one-time password deriving rule for generating a one-time password by being applied to pattern elements at specific positions in a case where a plurality of pattern elements arranged in a predetermined pattern are presented to a user who is to be authenticated as a presentation pattern is set as a password of the user, and the user is authenticated on the basis of a character string for authentication in which a user ID is embedded at a predetermined embedding position within the one-time password. In this event, a correct character string for authentication for the presented presentation pattern is generated as a verification code for all user IDs, and in a case where a verification code which matches a character string for authentication input from the user exists, user authentication of the user ID corresponding to the verification code is made successful.

12 Claims, 9 Drawing Sheets

(58) Field of Classification Search
USPC .......................................................... 713/168
See application file for complete search history.

(56) References Cited

U.S. PATENT DOCUMENTS

| | | | | |
|---|---|---|---|---|
| 11,770,259 | B2* | 9/2023 | Brownlee | ............. H04L 9/0866 |
| | | | | 713/168 |
| 2004/0068654 | A1* | 4/2004 | Cockerille | .............. G07F 17/32 |
| | | | | 713/168 |
| 2007/0226784 | A1 | 9/2007 | Ueda et al. | |
| 2009/0284344 | A1* | 11/2009 | Craymer | ................. H04L 9/321 |
| | | | | 726/19 |
| 2016/0378961 | A1* | 12/2016 | Park | ........................ G06F 21/36 |
| | | | | 726/19 |
| 2019/0228178 | A1* | 7/2019 | Sharma | ............... H04L 63/0853 |
| 2021/0227087 | A1* | 7/2021 | Ozaki | ................ H04N 1/00854 |

OTHER PUBLICATIONS

International Search Report, and Written Opinion, from Application No. PCT/JP2020/039694, dated Jan. 21, 2021, 8 pages.

* cited by examiner

USER AUTHENTICATION SYSTEM, USER AUTHENTICATION SERVER, AND USER AUTHENTICATION METHOD

CROSS-REFERENCE TO RELATED APPLICATIONS

This application is a 371 application of PCT/JP2020/039694 having an international filing date of Oct. 22, 2020, which claims priority to JP2019-215185 filed on Nov. 28, 2019, the entire content of each of which is incorporated herein by reference.

TECHNICAL FIELD

The present invention relates to a user authentication system, and more particularly, to a user authentication system which presents a plurality of pattern elements arranged in a predetermined pattern to a user who is to be authenticated as a presentation pattern, and is designed to use a one-time password deriving rule for generating a one-time password by being applied to pattern elements at specific positions included in the presentation pattern, as a password of the user.

BACKGROUND ART

As a user authentication scheme which remedies a problem of a challenge and response scheme in related art, use of a user authentication system of a so-called matrix authentication (registered trademark) scheme has been increased (see, for example, Patent Literature 1). In the matrix authentication, a matrix presentation pattern in which random numbers are arranged in a predetermined pattern is presented to a user who is to be authenticated, and a one-time password deriving rule for generating a one-time password by being applied to pattern elements (respective random numbers) included in the presentation pattern is used as a password of the user. The user authentication is performed without directly comparing passwords by sharing the same presentation pattern between a server and a client, and comparing a one-time password which is a result of applying a one-time password deriving rule which is a password at the client, to the presentation pattern, with a verification code which is a result of applying a one-time password deriving rule which is a password at the server, to the presentation pattern. In the matrix authentication, the one-time password deriving rule which is a password is positions and orders of pattern elements selected on a matrix, which is easily memorized as an image, and from which the password cannot be specified even if the selected pattern elements are peeked at upon input of the password.

FIG. 3 is a block diagram of a user authentication system 200 using typical matrix authentication in related art (Patent Literature 1). The user authentication system 200 mainly includes an authentication server 201 which authenticates a user, and an authentication request client 251 which is a terminal to be used by the user to request authentication. The authentication server 201 includes a one-time password deriving rule storage unit 202, user ID reception means 203, pattern generation means 204, pattern transmission means 205, verification code generation means 206, one-time password reception means 207, and user authentication means 208.

The authentication request client 251 includes user ID input means 252, user ID transmission means 253, pattern reception means 254, pattern display means 255, one-time password input means 256, and one-time password transmission means 257.

At the authentication server 201, the one-time password deriving rule storage unit 202 stores a user ID 202a and a one-time password deriving rule 202b in association with each other in advance. The user ID reception means 203 receives a user ID 281 of a user who is to be authenticated from the authentication request client 251, the pattern generation means 204 generates a pattern element sequence 290 which is a sequence of pattern elements included in a presentation pattern 291 in a matrix, using a predetermined generation rule such as pseudo random numbers, and the pattern transmission means 205 transmits the generated pattern element sequence 290 to the authentication request client 251.

To perform authentication, first, the user who is to be authenticated inputs his/her user ID 281 from the user ID input means 252 such as a keyboard at the authentication request client 251. The user ID transmission means 253 transmits the input user ID 281 to the authentication server 201. The user ID reception means 203 of the authentication server 201 receives the user ID 281. The pattern generation means 204 generates random numbers constituting the presentation pattern 291 in a matrix using a predetermined generation rule. The pattern transmission means 205 transmits the generated pattern element sequence 290 to the authentication request client 251. The pattern reception means 254 of the authentication request client 251 receives the pattern element sequence 290. The pattern display means 255 arranges the received pattern element sequence 290 in a predetermined pattern 291p to generate the presentation pattern 291 and displays the presentation pattern 291 on a screen.

FIG. 7 is a conceptual diagram of a one-time password input method in the matrix authentication scheme. The user sequentially extracts numbers displayed at predetermined positions on a matrix by applying the one-time password deriving rule 202b to the presentation pattern 291 and inputs the numbers from the one-time password input means 256. Alternatively, the user can also input numbers irrelevant to the presentation pattern 291. In other words, a fixed password can be included in the one-time password. The numbers are input typically using a pointing device such as a touch panel, a keyboard 296, and the like. Arrows and circles indicated with dashed lines in FIG. 7 indicate that the one-time password based on the presentation pattern 291 are input from the keyboard 296. The one-time password transmission means 257 transmits the input one-time password 292 to the authentication server 201. The one-time password reception means 207 at the authentication server 201 receives the one-time password 292. The verification code generation means 206 generates a verification code 293 which is a result of applying the one-time password deriving rule 202b associated with the received user ID 281 to the transmitted pattern element sequence 290. The user authentication means 208 compares the received one-time password 292 with the verification code 293 and makes authentication of the user successful in a case where the one-time password 292 matches the verification code 293.

CITATION LIST

Patent Literature

Patent Literature 1: Japanese Patent Laid-Open No. 2007-264839

SUMMARY OF INVENTION

Technical Problem

In a matrix authentication system in related art, first, a user ID is input on a user ID input screen at an authentication request client and transmitted to an authentication server, and then, pattern elements, or the like, constituting a presentation pattern in a matrix are transmitted from the authentication server to the authentication request client. The user then inputs a one-time password which is a response to the presentation pattern after the presentation pattern is displayed. In other words, it is necessary to input a user ID and then input a one-time password on another screen. Such an authentication method in related art which requires switching of display between two screens for authentication does not necessarily excel in user-friendliness. It is therefore necessary to provide a system which eliminates the need for a user ID input step and which achieves both identification and authentication of a user ID with only one step of inputting a one-time password at the same time to improve the user-friendliness.

Solution to Problem

The present invention has been made in view of the above-described problem and has the following features. In other words, the present invention is a user authentication system designed to use, as a password of a user who is to be authenticated, a one-time password deriving rule for generating a one-time password by being applied to pattern elements of specific positions in a case where a plurality of pattern elements arranged in a predetermined pattern are presented to the user as a presentation pattern, and authenticates the user on the basis of a character string for authentication in which a user ID is embedded at a predetermined embedding position within the one-time password, the user authentication system including an authentication server and an authentication request client, in which the authentication server includes: a password storage unit 102 configured to store a user ID 102a of the user, the one-time password deriving rule 102b of the user, and a user ID embedding position 102c which identifies a position at which the user ID is to be embedded within the one-time password, in advance in association with one another for each said user ID; presentation pattern determination information generation means 111 for generating presentation pattern determination information which determines the presentation pattern using a predetermined generation rule; verification code generation means 106 for generating a verification code in which the user ID is embedded on the basis of the user ID embedding position, in a result of applying the one-time password deriving rule associated with the user ID to the pattern elements constituting the presentation pattern determined on the basis of the presentation pattern determination information, for each said user ID; and presentation pattern determination information transmission means 112 for transmitting the generated presentation pattern determination information to the authentication request client of the user who is to be authenticated, the authentication request client includes: presentation pattern determination information reception means 161 for receiving the presentation pattern determination information transmitted from the authentication server; pattern element determination means 162 for determining pattern elements constituting the presentation pattern on the basis of the presentation pattern determination information; pattern display means 155 for arranging the determined pattern elements in the predetermined pattern to generate a presentation pattern and displaying the presentation pattern on a screen; authentication character string input means 156 for accepting input of a character string for authentication in which the user ID is embedded at the user ID embedding position in a one-time password which is a result of applying the one-time password deriving rule to the pattern elements included in the presentation pattern, from the user who is to be authenticated; and authentication character string transmission means 157 for transmitting the input character string for authentication to the authentication server, and the authentication server further includes: authentication character string reception means 107 for receiving the character string for authentication from the authentication request client; and user authentication means 108 for comparing the received character string for authentication with the verification code generated for each said user ID and making authentication of the user ID corresponding to the verification code successful in a case where the verification code which matches the received character string for authentication exists.

In the present invention, the presentation pattern determination information can be the pattern elements constituting the presentation pattern. Further, in the present invention, the presentation pattern determination information can be a pattern seed value which generates the pattern elements constituting the presentation pattern by being applied to a predetermined pattern element sequence generation rule. Still further, in the present invention, in a case where the verification code which matches two or more user IDs exists, the verification code generation means can repeat generation of the verification code for the user ID on the basis of the presentation pattern determination information newly generated by the presentation pattern determination information generation means until the verification code which matches two or more user IDs no longer exists. Further, in the present invention, the authentication character string transmission means stores the input character string for authentication, hashes the input character string for authentication with a hash function and transmits the hashed character string for authentication to the authentication server, the user authentication means can compare the received hashed character string for authentication with a hashed verification code obtained by hashing the verification code generated for each said user ID with the hash function, and, in a case where the hashed verification code matches the received hashed character string for authentication, transmit the user ID embedding position corresponding to the verification code and a length of a character string of the user ID to the authentication request client to inquire about the user ID within the character string for authentication, and in a case where the user ID obtained through the inquiry matches the user ID corresponding to the verification code, make authentication of the user ID successful.

The present invention is also embodied as a user authentication method using the above-described user authentication system, an authentication server for realizing such a user authentication system, and a user authentication method to be executed at such an authentication server.

In the invention described above or recited in the claims, terms such as a server and a client do not limit specific forms or specific name of apparatuses and represent apparatuses including general functions of the apparatuses. Functions of one component may be implemented with two or more physical components or functions of two or more components may be implemented with one physical component.

The invention of the system can be grasped as the invention of the method in which functions of the respective components are sequentially executed, and vice versa. In the invention of the method, execution order of respective steps is not limited to the described order, and the respective steps can be executed in free order as long as the functions can be executed without causing inconsistency as a whole. These inventions are also embodied as a program for implementing predetermined functions in cooperation with predetermined hardware and also embodied as a recording medium in which the program is recorded.

Advantageous Effects of Invention

The present invention provides that as a result of employing a configuration where a one-time password deriving rule for generating a one-time password by being applied to pattern elements at specific positions in a case where a plurality of pattern elements arranged in a predetermined pattern are presented to a user who is to be authenticated as a presentation pattern, is used as a password of the user, the user is authenticated on the basis of a character string for authentication in which a user ID is embedded at a predetermined embedding position within the one-time password, and at that time, a correct character string for authentication for the presented presentation pattern is generated for all user IDs as a verification code, and in a case where the verification code which matches the character string for authentication input from the user exists, user authentication of the user ID corresponding to the verification code is made successful, it is not necessary to specify the user by inputting the user ID to an authentication system upon start of authentication, and it is possible to perform both specification of the user and confirmation of authenticity of the user by inputting a single character string for authentication upon authentication, so that it is possible to provide effects of eliminating the need for inputting the user ID before inputting the password upon authentication and eliminating the need for switching display between two screens for authentication. In other words, the present invention provides effects of eliminating the need for a user ID input step, and enabling both identification and authentication of the user ID to be performed at the same time through only one step of inputting a character string including a one-time password.

DESCRIPTION OF EMBODIMENT

[User Authentication Method According to the Present Invention]

Figure 1:
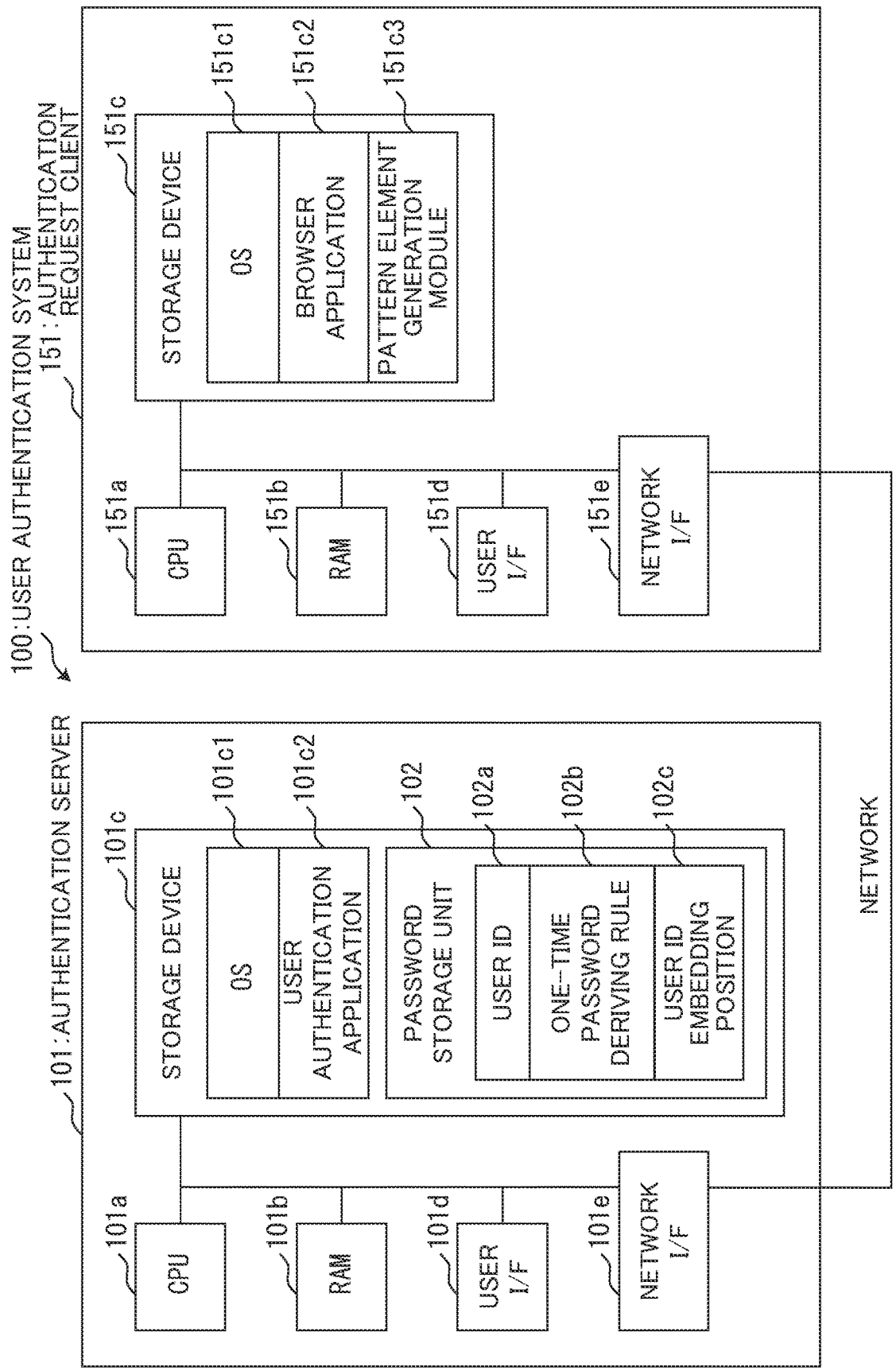
FIG. 1 is a hardware configuration diagram of a user authentication system 100 according to an embodiment of the present invention.
Figure 2:
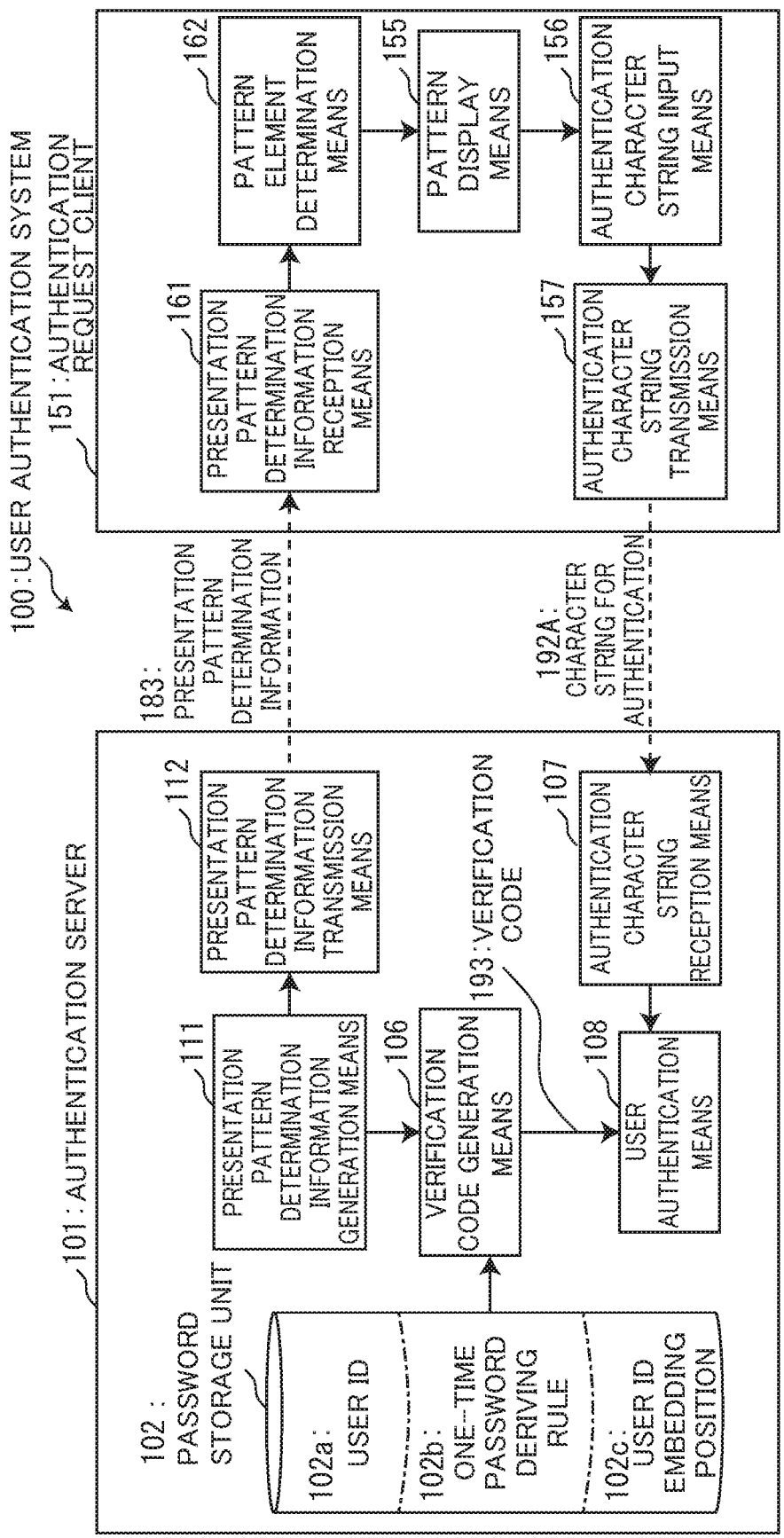
FIG. 2 is a functional block diagram of the user authentication system 100 according to an embodiment of the present invention.
Figure 3:
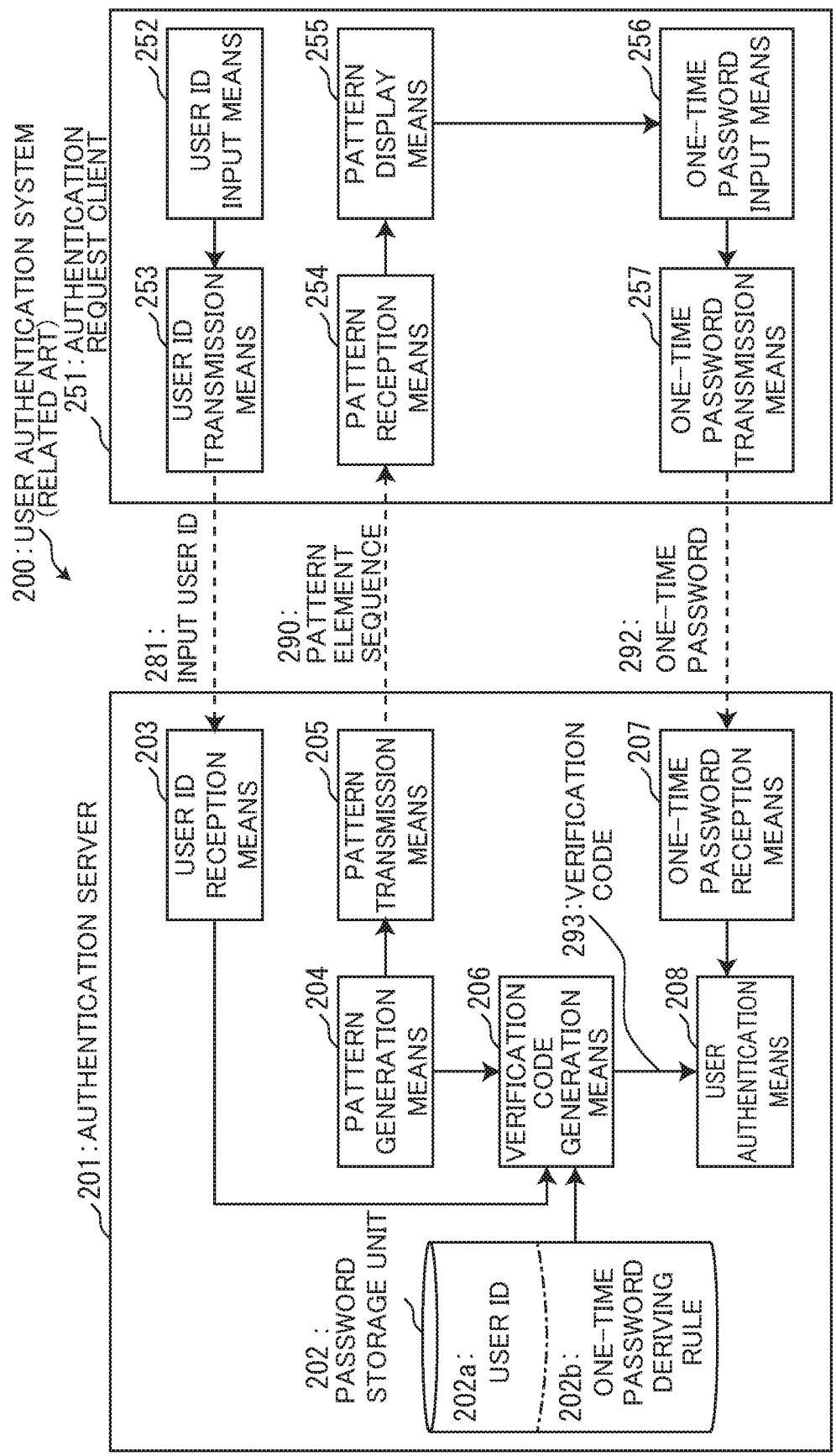
FIG. 3 is a block diagram of a user authentication system 200 in a matrix authentication scheme in related art.
Figure 4:
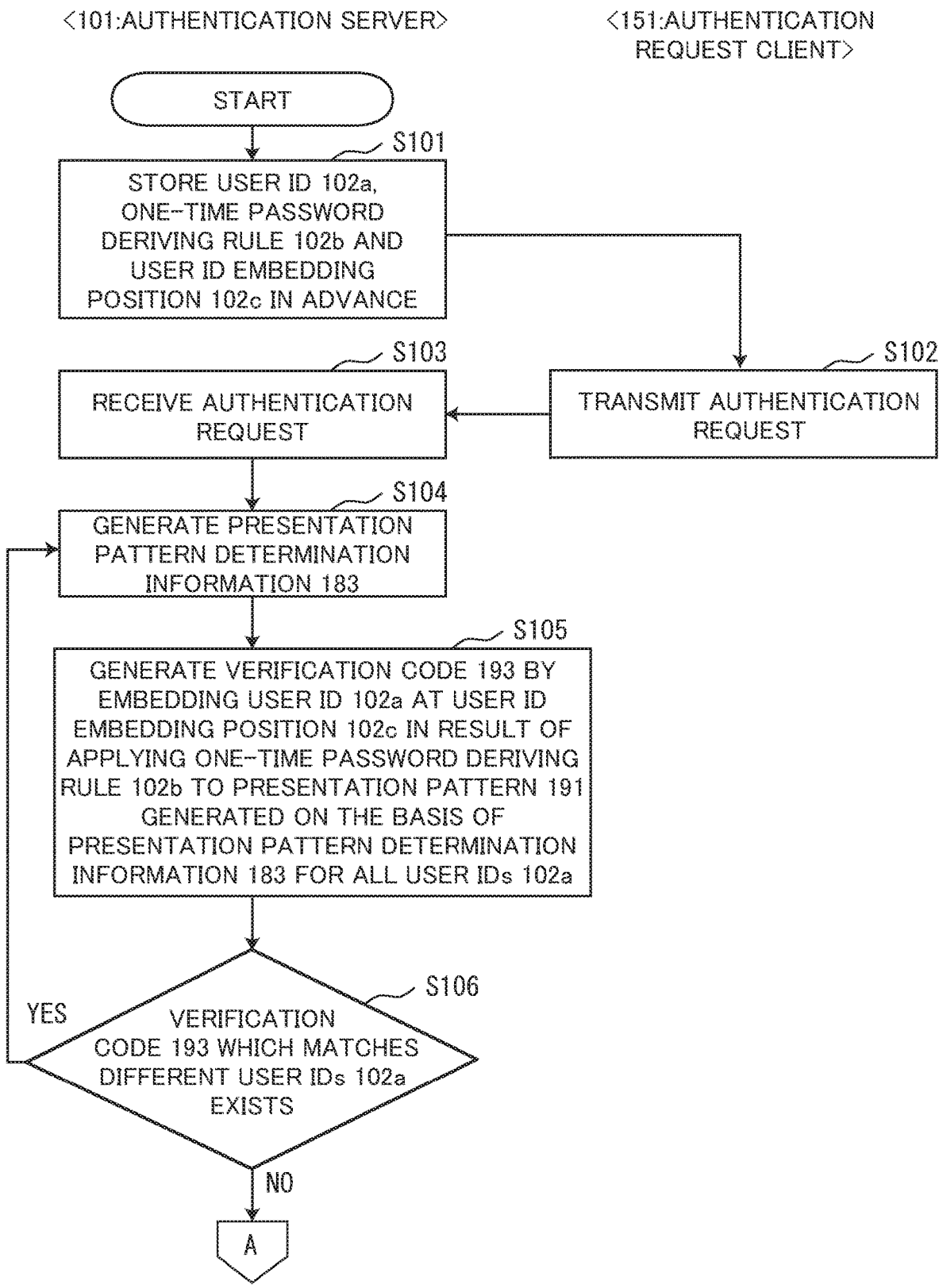
FIG. 4 is an operation flowchart of the user authentication system 100 according to an embodiment of the present invention.
Figure 5:
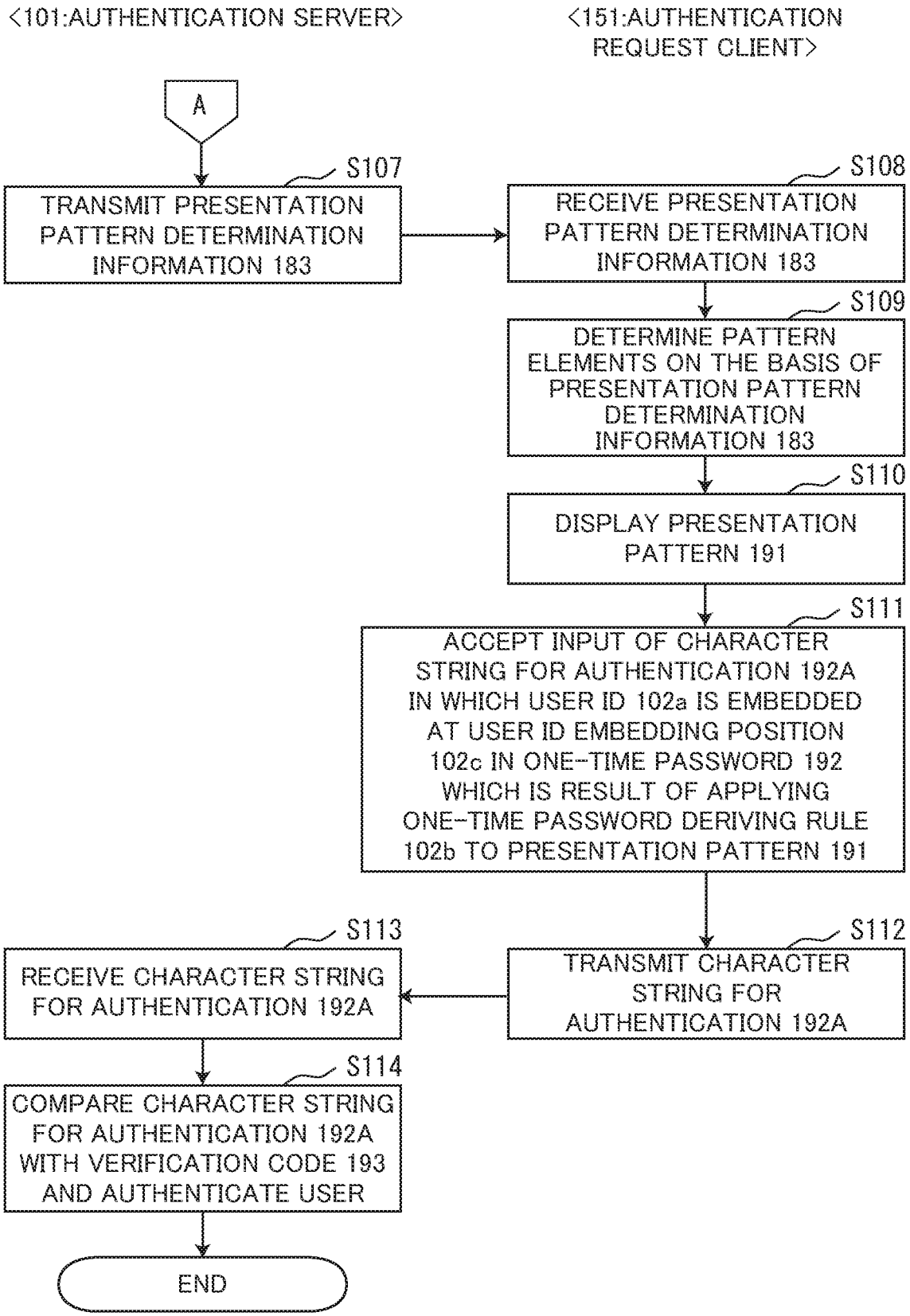
FIG. 5 is an operation flowchart of the user authentication system 100 according to an embodiment of the present invention, which continues from the operation flow illustrated in FIG. 4

A user authentication system 100 according to an embodiment of the present invention will be described below with reference to the drawings. In the drawings, the same numbers are assigned to last two figures of reference numerals concerning components which have correspondence between a user authentication system 200 in related art and the user authentication system 100 according to the present invention. FIG. 1 is a hardware configuration diagram, FIG. 2 is a block diagram, and FIGS. 4 and 5 are operation flowcharts. First, outline of a user authentication method according to the present invention will be described. The user authentication method according to the present invention is matrix authentication which is one type of a challenge and response authentication method as described above. In the user authentication method according to the present invention, a plurality of pattern elements arranged in a predetermined pattern are presented as a presentation pattern 191 to a user who is to be authenticated at the authentication request client 151, a one-time password deriving rule 102*b* for generating a one-time password 192 by being applied by the user to pattern elements 190 at specific positions included in the presentation pattern 191 is used as a password of the user. Presentation pattern determination information 183 which is information to be used to generate the presentation pattern 191 to be presented to the user at the authentication request client 151 is generated at the authentication server 101 and transmitted to the authentication request client 151. The presentation pattern determination information 183, which is information which uniquely determines the presentation pattern 191, may be the pattern elements 190 themselves, or may be a pattern seed value which uniquely determines the pattern elements 190 by performing predetermined calculation.

The user generates the one-time password 192 by applying the one-time password deriving rule 102*b* associated with the user ID 102*a* of the user to the presentation pattern 191 and inputs the one-time password 192 to the authentication request client 151 as a character string for authentication 192A in which the user ID 102*a* is embedded at a predetermined embedding position within the one-time password 192. The user determines the predetermined position in advance and stores the predetermined position in the authentication server 101 as a user ID embedding position 102*c* in association with the user ID 102*a*. The user ID 102*a* is information with which the user can be uniquely specified, and is typically, a character string set by the user. As the user ID 102*a*, arbitrary information unique to the user such as an individual number, a bank account number, an employee number, a membership number and an email address can be used besides the character string set by the user.

The character string for authentication 192A input from the user at the authentication request client 151 is transmitted to the authentication server 101 from the authentication request client 151. The authentication server 101 generates a correct one-time password 192 by applying the one-time password deriving rule 102*b* associated with the user ID 102*a* to the presentation pattern 191 displayed at the authentication request client 151 for all the user IDs 102*a*, and generates a verification code 193 by embedding the user ID 102a at the embedding position of the user ID embedding position 102c. The authentication server 101 then compares the character string for authentication 192A transmitted from the authentication request client 151 with the verification code 193 and, in a case where the character string for authentication 192A matches the verification code 193, makes authentication for the user successful.

[Presentation Pattern and Pattern Elements]

The presentation pattern 191 is obtained by arranging the pattern elements 190 in the predetermined pattern 191p. Typical examples of the predetermined pattern 191p can include a matrix in which the pattern elements are arranged at respective positions of n rows by m columns so as to form a rectangle as a whole, a pattern in which a plurality of such matrixes are arranged, and the like, the predetermined pattern 191p may have other arbitrary shapes. In the present specification, the authentication scheme will be referred to as a matrix authentication scheme also in a case where the presentation pattern having shapes other than such a typical matrix is used. A regular shape or an impressive shape is preferable as the predetermined pattern 191p, because it remains in the user's memory longer, and thus, the user can easily memorize the one-time password deriving rule 102b which is the password of the user.

The pattern elements 190 are elements arranged at predetermined positions so as to constitute the predetermined pattern 191p within the presentation pattern 191, and are preferably single-digit numbers from 0 to 9, or can be arbitrary characters such as alphabets and symbols. Note that as the symbols, symbols such as "+", "–", "*", "=", "_", "!", "?", "#", "$", and "&" allocated to a standard keyboard of a PC are particularly preferable. As the characters, designs such as graphics, illustrations and photos can also be used. A plurality of the same pattern elements 190 are preferably displayed within the presentation pattern 191. Such display achieves many-to-one correspondence between the one-time password deriving rule 102b which is the password, and the one-time password 192 which is a result of applying the one-time password deriving rule 102b to the presentation pattern 191, which automatically achieves one direction upon input of the one-time password 192. In other words, processing similar to hash function calculation is automatically performed upon input of the one-time password 192, which prevents the one-time password deriving rule 102b from being specified from only one one-time password 192.

Figure 7:
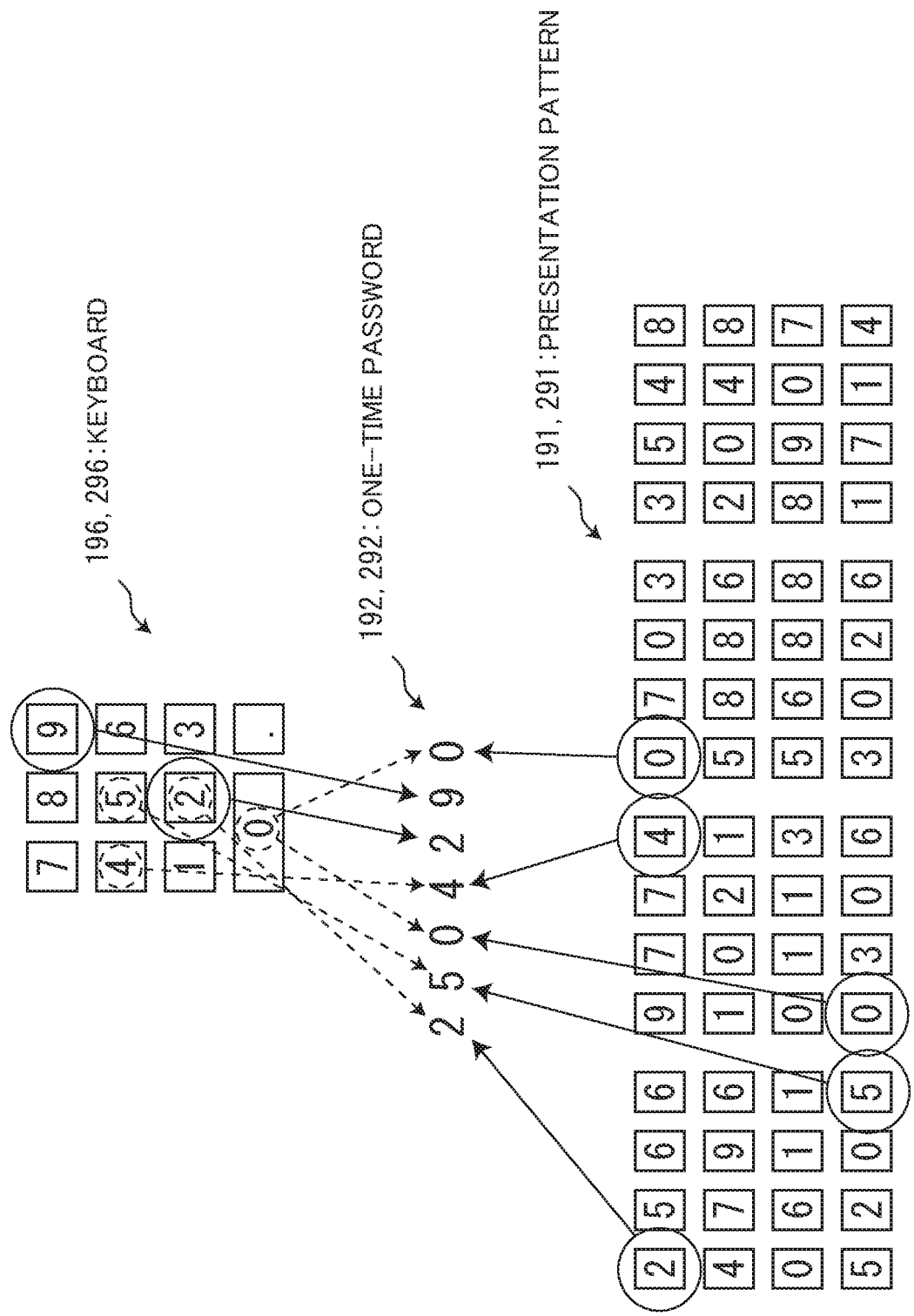
FIG. 7 is a conceptual diagram of a one-time password input method in the matrix authentication scheme.

In the present example, it is assumed that the pattern elements 190 include single-digit numbers from 0 to 9 as illustrated in FIG. 7, and the like, and the presentation pattern 191 is obtained by arranging the respective pattern elements 190 in the predetermined pattern 191p including four matrixes of 4×4. Note that in a case where an area of a screen is small, such as in a case of a mobile phone, it is preferable to reduce the number of matrixes of 4×4 constituting the presentation pattern 191, to three, or the like.

[Presentation Pattern Determination Information]

The presentation pattern determination information 183 is information with which the pattern elements 190 arranged in the predetermined pattern 191p can be uniquely determined for generating the presentation pattern 191. The presentation pattern determination information 183 may be data in which the pattern elements 190 themselves are sequentially arranged or may be a pattern seed value with which the pattern elements 190 can be uniquely generated through predetermined calculation. As the predetermined calculation, various kinds of calculation such as hash function calculation, addition, subtraction, exclusive OR and adjustment of the number of digits can be used. The pattern seed value is typically a constant generated within a predetermined range through a predetermined generation rule.

[One-Time Password Deriving Rule]

The one-time password deriving rule 102b, which is a rule for generating the one-time password 192 by being applied to the pattern elements 190 at specific positions included in the presentation pattern 191, is data which functions as a password of the user. The rule to be applied to the pattern elements 190 is typically involved with selection of positions of the pattern elements 190 and selection of order of the pattern elements 190. In this case, the one-time password deriving rule 102b is information of combination of respective positions of the pattern elements 190 which are included in the presentation pattern 191 and which are to be selected, and selection order of the respective pattern elements 190. Further, the one-time password deriving rule 102b may include information regarding characters such as numbers input independently of the presentation pattern 191 as a fixed password, in which case, the one-time password deriving rule 102b is information of combination of respective positions of the pattern elements 190 which are included in the presentation pattern 191 and which are to be selected and respective characters of the fixed password irrelevant to the presentation pattern 191, and positions of the respective pattern elements 190 and selection or input order of the respective characters.

Figure 6:
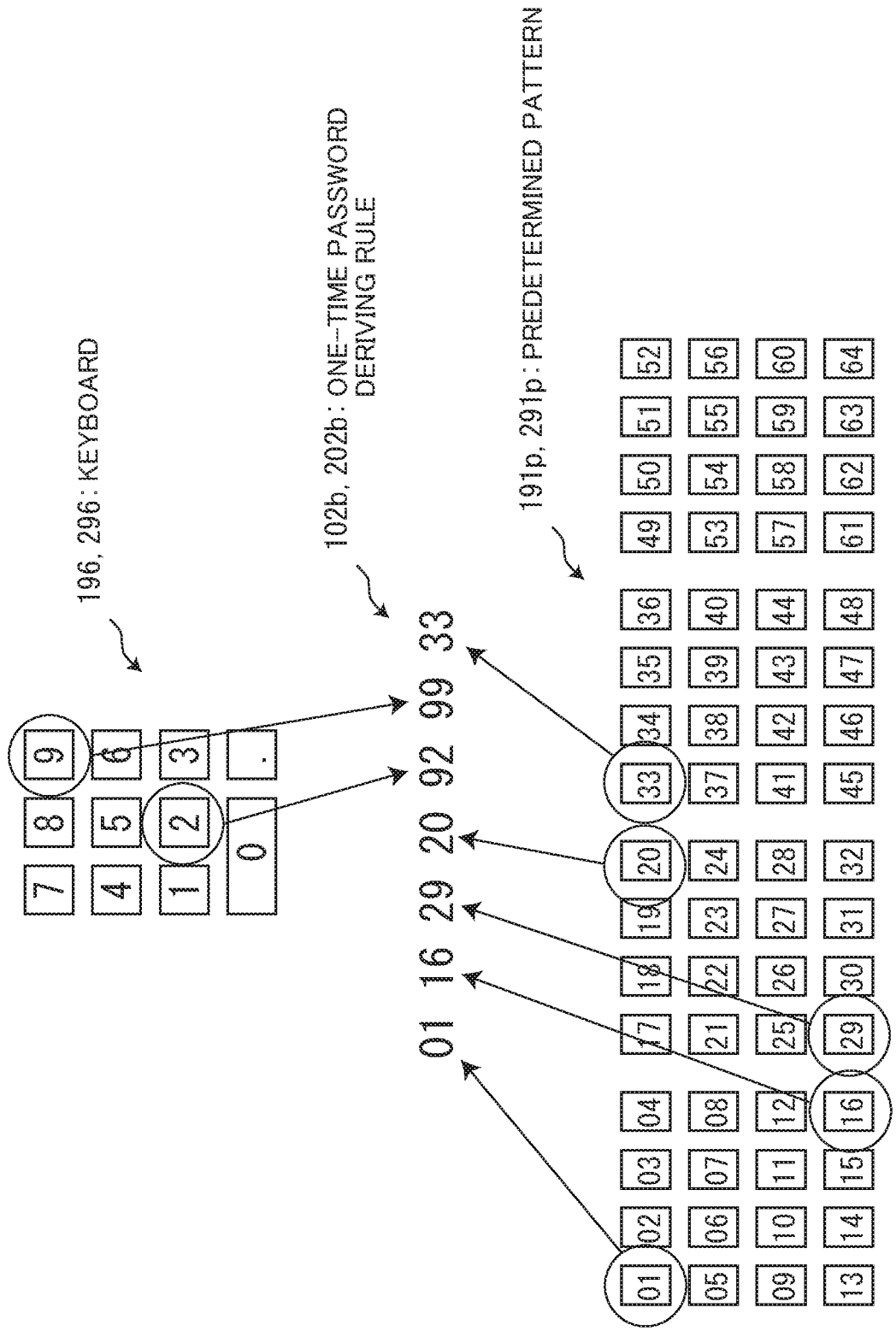
FIG. 6 is a conceptual diagram of a one-time password deriving rule in the matrix authentication scheme.

FIG. 6 illustrates a structure of a typical one-time password deriving rule 102b. In the present example, the pattern elements 190 include single-digit numbers from 0 to 9, and the one-time password deriving rule 102b for the presentation pattern 191 in which the respective pattern elements 190 are arranged at positions of respective elements of the predetermined pattern 191p including four matrixes of 4×4 is illustrated. In FIG. 6, the positions of the respective elements in the predetermined pattern 191p are distinctively displayed using numbers from 01 to 64. When the presentation pattern 191 is displayed to the user who is to be authenticated, single-digit numbers from 0 to 9 are displayed at the positions of the respective elements of the predetermined pattern 191p.

The one-time password 192 preferably uses a number based on the presentation pattern 191 and a number input independently of the presentation pattern 191. The number of pattern elements included in the presentation pattern 191 is 64, and thus, selection of respective positions of the pattern elements included in the presentation pattern 191 is represented by a double-digit number from 01 to 64 allocated to the respective positions. Further, the number input independently of the presentation pattern 191 is represented by a double-digit number in which a number of "9" which indicates that the number is the number input independently of the presentation pattern 191 is allocated first, and the input one-digit number is allocated next. In the example in FIG. 6, the first four numbers of the one-time password 192 are input by the pattern elements at specific positions of the presentation pattern 191 being selected. Numbers "01", "16", "29" and "20" which represent positions of the elements are sequentially arranged as portions corresponding to the numbers of the one-time password deriving rule 102b. The selected pattern elements 190 are input using a keyboard 196 or a pointing device such as a touch panel. The next two numbers of the one-time password 192 are input from the keyboard 196, or the like, independently of the presentation pattern 191. "92" and "99" in which the input numbers of "2" and "9" are respectively added to the number of "9" indicating that the numbers are directly input are sequentially arranged as portions corresponding to the numbers of the one-time password deriving rule 102b. The next last number of the one-time password 192 is input by the pattern elements at specific positions of the presentation pattern 191 being selected. "33" which is a number representing the position is sequentially arranged as the portion corresponding to the number of the one-time password deriving rule 102b, and the one-time password deriving rule 102b ends here. An end mark, for example, a number such as "00" which uniquely specifying an end point of the one-time password deriving rule 102b may be further added to the last, or a numerical value indicating a total length of the one-time password deriving rule 102b may be associated with the one-time password deriving rule 102b.

[One-Time Password]

The one-time password 192 is a disposable password generated and input by the user who is to be authenticated applying his/her one-time password deriving rule 102b to the presentation pattern 191. FIG. 7 is a conceptual diagram of a method for inputting a one-time password in a matrix authentication scheme. The one-time password deriving rule 102b used in FIG. 7 is the same as that illustrated in FIG. 6. The user generates "2504290" as the one-time password 192 by selecting the pattern elements 190 at predetermined positions included in the presentation pattern 191 and inputting predetermined numbers irrelevant to the presentation pattern 191 in predetermined order in accordance with his/her one-time password deriving rule 102b.

[User ID Embedding Position and Character String for Authentication]

Figure 8:
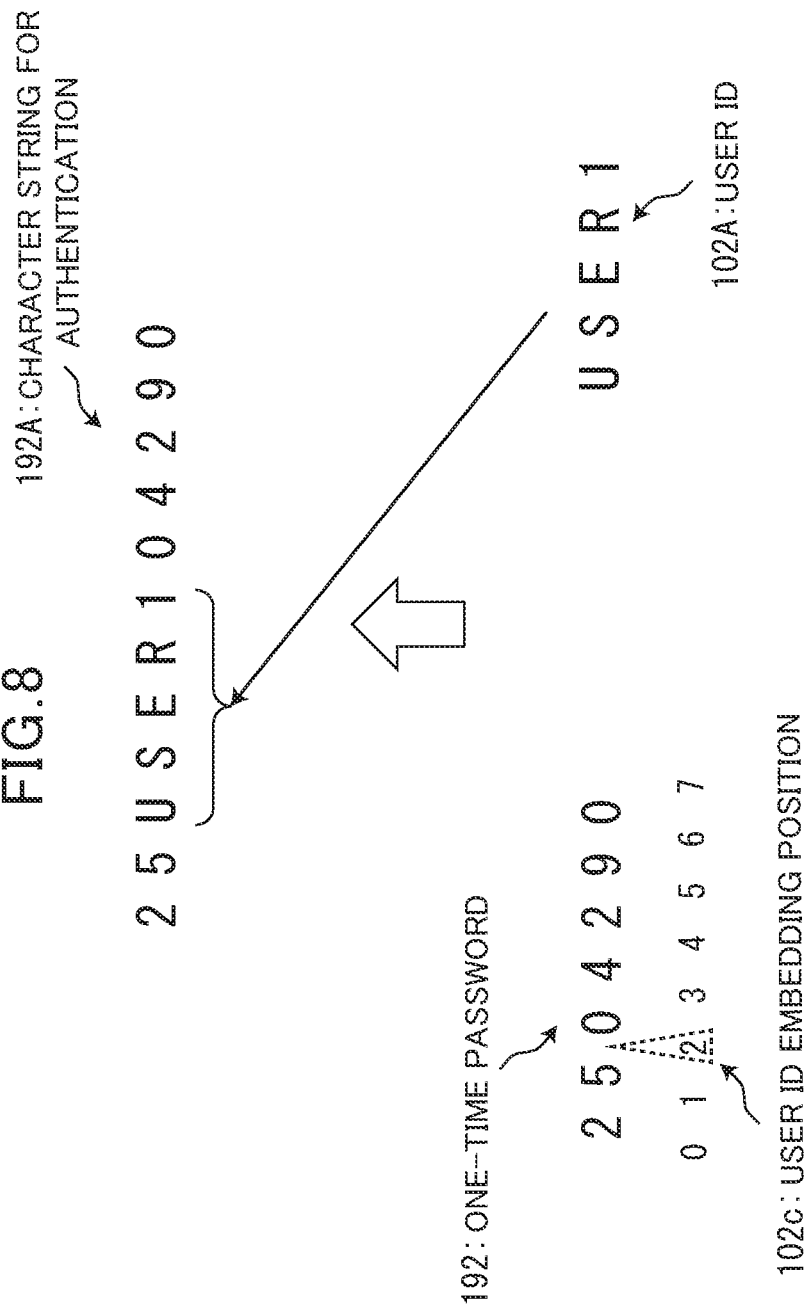
FIG. 8 is an explanatory diagram of a structure of a character string for authentication.

FIG. 8 is an explanatory diagram of a structure of the character string for authentication 192A. The character string for authentication 192A is constituted by the user ID 102a being embedded at predetermined embedding positions within the one-time password 192. The user ID embedding position 102c is information which specifies the embedding positions at that time. In the example in FIG. 8, numbers from 0 to 7 are allocated to positions at which the user ID can be embedded within the one-time password 192 of "2504290", and the user ID embedding position 102c is an embedding position indicated with "2" (enclosed with a dashed triangle symbol) between "5" and "0" of the one-time password 192. The user determines his/her user ID embedding position 102c in advance and stores the user ID embedding position 102c in the password storage unit 102. The user ID embedding position 102c which is set by the user, also functions as part of the password. In the example in FIG. 8, the character string for authentication 192A of "25USER104290" is constituted by the user ID 102a of "USER1" being embedded at the user ID embedding position 102c of "2" in the one-time password 192 of "2504290". In this manner, the character string for authentication 192A is obtained by integrating both information regarding the user ID 102a which specifies the user and information regarding the one-time password 192 for confirming authenticity of the user which is generated in accordance with the one-time password deriving rule 102b which is a password. In other words, verification as to whether a single character string of the character string for authentication 192A is valid makes it possible to confirm the user ID 102a of a user who is being authenticated and authenticity of the user, and eventually, makes it possible to confirm whether the user has been successfully authenticated.

[Hardware Configuration of User Authentication System 100]

A configuration of the user authentication system 100 will be described next. FIG. 1 is a hardware configuration diagram of the user authentication system 100 according to an embodiment of the present invention. Referring to FIG. 1, the user authentication system 100 mainly includes the authentication server 101 and the authentication request client 151. The authentication server 101 includes a CPU 101a, a RAM 101b, a storage device 101c, a user interface (I/F) 101d, and a network interface (I/F) 101e. The storage device 101c stores an OS 101c1 and user authentication application 101c2 in its storage region and includes a password storage unit 102 in its storage region. The password storage unit 102 stores the user ID 102a, the one-time password deriving rule 102b, and the user ID embedding position 102c. The authentication request client 151 includes a CPU 151a, a RAM 151b, a storage device 151c, a user interface (I/F) 151d and a network interface (I/F) 151e. The storage device 151c stores an OS 151c1, browser application 151c2 and a pattern element generation module 151c3 in its storage region.

The authentication server 101 is a component which authenticates a user in response to a user authentication request from the authentication request client 151 in the user authentication system 100. The authentication server 101 takes a form of a computer, or the like, as a server in which the OS 101c1, the user authentication application 101c2, and the like, are installed. Further, the authentication server 101 can take a form of hardware which provides user authentication at a gateway device such as an SSL-VPN gateway for providing a virtual private network on the Internet. The CPU 101a is a processor which executes the user authentication application 101c2, and the like, on the OS 101c1 to perform information processing regarding user authentication. The RAM 101b is a memory which provides memory space on which software stored in the storage device 101c is to be loaded, a work area, and the like, which are required when the loaded software is executed by the CPU 101a. The storage device 101c is a component which stores and manages information of software, data, and the like, and typically takes a form of a hard disk drive, or the like. The storage device 101c preferably stores files of programs of the OS 101c1 and the user authentication application 101c2, and these programs are read out on the RAM 101b and executed. The user I/F 101d is a component through which the user inputs data and through which data is output to the user, and typically includes input means including a keyboard 196 and a pointing device such as a mouse, output means such as a display which displays information on a screen, and a hardware I/F between these means.

The authentication server 101 is connected to the authentication request client 151 via a network. The network is preferably the Internet or an intranet which operates with TCP/IP based protocol. In a case where the authentication request client 151 operates on Windows (registered trademark, the same applies hereinafter) OS for client in the intranet, a Windows domain network which operates with TCP/IP based protocol can be used as the network. Note that while description is provided using an example of Windows as an OS in the present specification, other OSs such as, for example, Mac OS (registered trademark), Linux (registered trademark) and Unix (registered trademark) can be used.

The authentication method according to the present invention can be implemented using the following at least two utilization forms. One utilization form is a form of authentication for allowing the user to use Web content, SSL-VPN service and application using a Web browser in a state where the authentication request client 151 is connected to Web service on the network. In this case, the authentication server 101 typically takes a form of a Web server which is disposed on the network such as the Internet and the intranet, provides a Web page for user authentication to the authentication request client 151 which accesses the Web server through the network, and transmits and receives data for user authentication through the Web page, or a form of a device like an SSL-VPN gateway, which performs authentication and accounting management in cooperation with a RADIUS server and which provides a virtual private network on the Internet.

The other utilization form is a form of authentication for allowing the user to log on to a Windows domain network when the user connects to the Windows domain network which is the same as the network of the authentication server 101 as a valid network user using the authentication request client 151. In this case, the authentication server 101 typically provides a resource for authentication on the network, executes user authentication in response to a request for authentication to log on to the Windows domain network made by the user using the authentication request client 151 with the resource, and transmits the authentication result to a domain controller which manages authority of network users of the Windows domain network.

The OS 101c1 is an operating system which performs basic information processing which is closely related to hardware of the authentication server 101. The user authentication application 101c2 is application software for user authentication, which operates on the OS 101c1. In a case where the authentication server 101 takes a form of a Web server, the user authentication application 101c2 is typically a Web server program which includes an authentication program having a form of being called using a CGI or a form of a servlet, and which provides a Web page for authentication or a resource on a Web of the Internet or the intranet. The password storage unit 102 is typically one region of a storage device such as a hard disk drive, and data is preferably stored in the password storage unit 102 as an encrypted file. The user ID 102a is data of a character string for uniquely identifying the user. As described above, the one-time password deriving rule 102b is a rule for generating the one-time password 192 by being applied to the pattern elements 190 at specific positions included in the presentation pattern 191, and is data which functions as a password of the user. The user ID embedding position 102c is an embedding position within the one-time password 192 at which the user ID 102 is to be embedded to constitute the character string for authentication 192A.

The authentication request client 151, which is a component to be used by the user to request authentication to the authentication server 101 in the user authentication system 100, is an information terminal in which the OS 151c1, the browser application 151c2, the pattern element generation module 151c3, and the like, are installed, and specifically takes a form of a PC, a smartphone, a mobile phone, or the like. The CPU 151a is a processor which executes the browser application 151c2, the pattern element generation module 151c3, and the like, on the OS 151c1 to perform information processing regarding user authentication request. The RAM 151b is a memory which provides memory space in which software stored in the storage device 151c is to be loaded, a work area, and the like, which is required when the loaded software is executed by the CPU 151a. The storage device 151c is a component which stores and manages information such as software and data, and typically takes a form of a hard disk drive, or the like. The storage device 151c preferably stores file of programs of the OS 151c1, the browser application 151c2, and the pattern element generation module 151c3, and these programs are read out on the RAM 151b and executed. Note that the storage device 151c may take a form in which programs of the OS 151c1, the browser application 151c2 and the pattern element generation module 151c3 are stored in a ROM. In this case, such a ROM and a program execution element such as the CPU 151a constitute firmware. The user I/F 151d, which is a component through which the user inputs data and through which data is output to the user, typically includes input means including the keyboard 196 and a pointing device such as a touch panel, output means such as a display which displays information on a screen and a hardware I/F between these means, while not illustrated. The network I/F 151e is an I/F for connecting to a network to input and output information.

Part or all of the OS 151c1, the browser application 151c2 and the pattern element generation module 151c3 may be combined to be an integrated program as a form. For example, the browser application 151c2 may include functions of the pattern element generation module 151c3, and the OS 151c1 may include functions of the browser application 151c2 and the pattern element generation module 151c3. Further, these may be incorporated into other application. Still further, these are divided into a plurality of programs.

The OS 151c1, which is an operating system performing basic information processing which is closely related to hardware of the authentication request client 151, is a basic program in accordance with the hardware of the authentication request client 151. The OS 151c1 may take a form of firmware of an architecture which conforms to a platform. The browser application 151c2 which is software operating on the OS 151c1, accessing information provided on the network and displaying the information, and further, implementing functions of a browser for accepting input of data from the user, typically takes a form of Web browser application for accessing a Web page on the Internet or the intranet. Note that the browser application 151c2 is not limited to Web browser application, and may be any application which enables access to a screen for user authentication provided by the server on the network. The browser application 151c2 may take a form of firmware of an architecture which conforms to a platform which provides an API for displaying a screen when other application performs authentication. The pattern element generation module 151c3 is a program which is incorporated into the browser application 151c2 and executed, and which is a program for generating the presentation pattern 191 and displaying the presentation pattern 191 on a browser, and typically takes a form of Java (registered trademark) applet, ActiveX (registered trademark), Flash (registered trademark), or the like, in a case where the authentication request client 151 is a PC. The pattern element generation module 151c3 may take a form of firmware of an architecture which conforms to a platform which provides an API for allowing other application to perform authentication.

In a case where the authentication server 101 performs authentication for logon to a Windows domain network, the browser application 151c2 and the pattern element generation module 151c3 for authentication are incorporated into the OS 151c1 as a Windows OS for client, and display the presentation pattern 191 on a screen of authentication for logon to the Windows domain network at the authentication request client 151 and provides user authentication procedure based on the authentication method according to the present invention.

Figure 9:
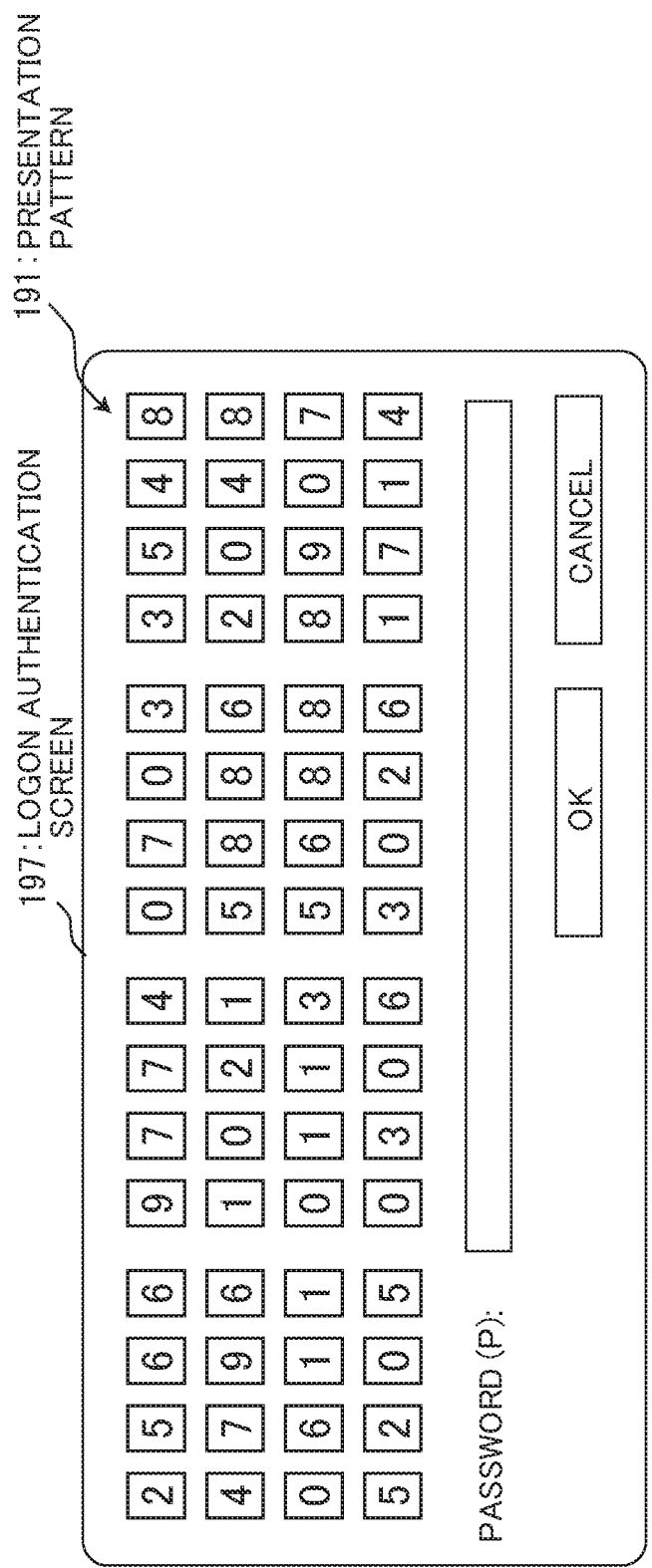
FIG. 9 illustrates an image of a logon authentication screen in the user authentication system 100.

FIG. 9 illustrates an image of a logon authentication screen 197 in the user authentication system 100. This may be an authentication screen when the user tries to log on to the Windows domain network or may be an authentication screen when the user tries to log on to Web service using the browser application 151c2. The presentation pattern 191 and a password input field are displayed on the logon authentication screen 197. When character such as numbers are input in the password input field as the character string for authentication 192A using the keyboard 196 and a pointing device such as a touch panel, the characters or symbols like "*" are displayed one by one in response to the input. In a case of logon to the Windows domain network, if input of the character string for authentication 192A is completed, the authentication module transmits the character string for authentication 192A to the authentication server 101 to execute user authentication, and transmits the authentication result to a domain controller. In a case of Web based logon using the browser application 151c2, the authentication server 101 transmits the authentication result to the Web service which the user tries to use.

[Functional Block Configuration of User Authentication System 100]

FIG. 2 is a functional block diagram of the user authentication system 100 according to an embodiment of the present invention. FIG. 2 is a view illustrating the user authentication system 100 having the hardware configuration illustrated in FIG. 1 in terms of information processing to be performed by software and hardware resources in cooperation with each other, and is a view illustrating the information processing in units of a functional block. In FIG. 2, the authentication server 101 includes a password storage unit 102, verification code generation means 106, authentication character string reception means 107, user authentication means 108, presentation pattern determination information generation means 111, and the presentation pattern determination information transmission means 112. These functional blocks are implemented in cooperation with hardware elements such as the RAM 101b, the storage device 101c, the user I/F 101d and the network I/F 101e as appropriate by the user authentication application 101c2 being loaded on the RAM 101b from the storage device 101c along with the OS 101c1, and these kinds of software being executed by the CPU 101a.

The password storage unit 102 is a storage device for storing the user ID 102a, the one-time password deriving rule 102b which is a password of the user, and the user ID embedding position 102c in association with one another in advance concerning each user, and is a functional block implemented by the CPU 101a, the RAM 101b, the storage device 101c, and the like, cooperating with software. The verification code generation means 106 is a component which generates the verification code 193 in which the user ID 102a is embedded at a position indicated by the user ID embedding position 102c in a result of applying the one-time password deriving rule 102b which is a password of the user who is to be authenticated, to the presentation pattern 191 displayed at the authentication request client 151, and is a functional block implemented by the CPU 101a, the RAM 101b, and the like, cooperating with software. Here, the verification code 193 is the same value as the character string for authentication 192A in a case where the user ID 102a is embedded at the position indicated by the correct user ID embedding position 102c in the correct one-time password 192 which is a result of applying the correct one-time password deriving rule 102b to the correct presentation pattern. The authentication character string reception means 107 is a component which receives the character string for authentication 192A input at the authentication request client 151 from the authentication request client 151, and is a functional block implemented by the CPU 101a, the RAM 101b, the network I/F 101e, and the like, cooperating with software. The user authentication means 108 is a component which compares the character string for authentication 192A with the verification code 193 and makes user authentication successful in a case where the character string for authentication 192A matches the verification code 193, and is a functional block implemented by the CPU 101a, the RAM 101b, and the like, cooperating with software. The presentation pattern determination information generation means 111 is a component which generates the presentation pattern determination information 183 which is information specifying the presentation pattern using a predetermined generation rule, and is a functional block implemented by the CPU 101a, the RAM 101b, and the like, cooperating with software. The presentation pattern determination information transmission means 112 is a component which transmits the presentation pattern determination information 183 generated by the presentation pattern determination information generation means 111 to the authentication request client 151, and is a functional block implemented by the CPU 101a, the RAM 101b, the network I/F 101e, and the like, cooperating with software.

The authentication request client 151 includes pattern display means 155, authentication character string input means 156, authentication character string transmission means 157, presentation pattern determination information reception means 161, and pattern element determination means 162. These functional blocks are implemented in corporation with hardware components such as the RAM 151b, the storage device 151c, the user I/F 151d, and the network I/F 151e as appropriate by a necessary portion of the browser application 151c2 and the pattern element generation module 151c3 being loaded on the RAM 151b from the storage device 151c along with a necessary portion of the OS 151c1, and these kinds of software being executed by the CPU 151a.

The pattern display means 155 is a component which arranges the pattern elements 190 determined by the pattern element determination means 162 which will be described later in the predetermined pattern 191p to generate the presentation pattern 191, and displays the presentation pattern 191 on a screen, and is a functional block implemented by the CPU 151a, the RAM 151b, the user I/F 151d, and the like, cooperating with software. The authentication character string input means 156 is a component which accepts input of the character string for authentication 192A from the user through the presentation pattern 191, or the like, displayed on the screen, and is a functional block implemented by the CPU 151a, the RAM 151b, the user I/F 151d, and the like, cooperating with software. The authentication character string transmission means 157 is a component which transmits the input character string for authentication 192A to the authentication server 101, and is a functional block implemented by the CPU 151a, the RAM 151b, the network I/F 151e, and the like, cooperating with software. The presentation pattern determination information reception means 161 is a component which receives the presentation pattern determination information 183 from the authentication server 101, and is a functional block implemented by the CPU 151a, the RAM 151b, the network I/F 151e, and the like, cooperating with software. The pattern element determination means 162 is a component which determines the pattern elements 190 on the basis of the presentation pattern determination information 183 received from the authentication server 101, and is a functional block implemented by the CPU 151*a*, the RAM 151*b*, and the like, cooperating with software.

[Operation of User Authentication System 100]

Operation of the user authentication system 100 will be described below. FIG. 4 and FIG. 5 are operation flowcharts of the user authentication system 100. First, the user who is to be authenticated in the user authentication system 100 inputs and registers the user ID 102*a*, the one-time password deriving rule 102*b* which is a password, and the user ID embedding position 102*c* in the authentication server 101 in advance. The password storage unit 102 stores the user ID 102*a*, the one-time password deriving rule 102*b* and the user ID embedding position 102*c* of the user in association with one another in advance prior to authentication of the user (step S101).

Then, the user who is to be authenticated causes a logon authentication screen 197 to be displayed to log on to Windows or log on to Web service at the authentication request client 151. In this event, the authentication request client 151 transmits an authentication request to the authentication server 101 (step S102), and the authentication server 101 receives the authentication request (step S103) and starts process for authentication. The authentication server 101 first generates the presentation pattern determination information 183 at the presentation pattern determination information generation means 111 to thereby generate the pattern elements 190 which constitute the presentation pattern 191 (step S104). In other words, the authentication server 101 generates the pattern elements 190 themselves or a pattern seed value which uniquely determines the pattern elements 190 with a random number by performing predetermined calculation and generates the pattern elements 190 and the presentation pattern 191 in which the pattern elements 190 are arranged in the predetermined pattern 191*p*.

The verification code generation means 106 of the authentication server 101 generate the verification code 193 (corresponding to the correct character string for authentication 192A) by embedding the user ID 102*a* at the user ID embedding position 102*c* associated with the user ID 102*a* in a result (corresponding to the correct one-time password 192) of applying the one-time password deriving rule 102*b* associated with the user ID 102*a* to the presentation pattern 191 generated on the basis of the generated presentation pattern determination information 183 for each of all the user IDs 102*a* which have already been registered. It is possible to confirm whether the correct character string for authentication 192A has been transmitted from the authentication request client 151 upon authentication by comparing the character string for authentication 192A with this verification code 193.

Here, there is a possibility that a collision may occur in a case where there are a plurality of user IDs 102*a* which match correct character string for authentication 192A with respect to a presentation pattern 191, depending on content and the embedding position of the user ID 102*a* which is to be embedded within the character string for authentication 192A. In this case, even if it can be confirmed that the character string for authentication 192A is valid, that is, even if it can be confirmed that there is a verification code 193 which matches the character string for authentication 192A, it is impossible to distinguish between these user IDs 102*a*, and it is impossible to uniquely specify the user.

To prevent inconvenience as described above, the verification code generation means 106 of the authentication server 101 preferably confirms whether a verification code 193 which matches different user IDs 102*a* exists (step S106). Then, in a case where a verification code 193 which matches two or more user IDs 102*a* exists, it is judged that a collision occurs, and the processing returns to process in step S104 where new presentation pattern determination information 183 (that is, a new presentation pattern 191 constituted with new pattern elements 190) is generated. Then, a new verification code 193 is generated in the next step S105, and it is confirmed in the next step S106 whether there are a plurality of user IDs 102*a* having the verification code 193. Such confirmation is executed until there is no longer a verification code 193 which matches different user IDs 102*a*. Execution of this ensures that different verification codes 193 exist for all the user IDs 102*a*, which makes it possible to perform specification of the user and confirmation of authenticity of the user at the same time through confirmation of the character string for authentication 192A using the verification code 193.

Note that if it is ensured that different verification codes 193 exist for all the user IDs 102*a* using another method, the processing of step S106 is not necessarily required. For example, by setting the same user ID embedding position 102*c* for all the users, and setting the same length for the character strings of the user IDs 102*a*, the user ID 102*a* appears at the same position within the character string for authentication 192A, so that it is ensured that different verification codes 193 exist for all the user IDs 102*a*.

The presentation pattern determination information transmission means 112 of the authentication server 101 transmits the presentation pattern determination information 183 to the authentication request client 151 (step S107). The presentation pattern determination information reception means 161 of the authentication request client 151 receives the presentation pattern determination information 183 from the authentication server 101 (step S108). The pattern element determination means 162 of the authentication request client 151 determines the pattern elements 190 on the basis of the received presentation pattern determination information 183 (step S109). In other words, the pattern element determination means 162 sets the received presentation pattern determination information 183 as the pattern elements 190 in a case where the presentation pattern determination information 183 is the pattern elements 190 themselves, and generates the pattern elements 190 by performing predetermined calculation in a case where the presentation pattern determination information 183 is a pattern seed value. The pattern display means 155 of the authentication request client 151 arranges the generated pattern elements 190 in the predetermined pattern 191*p* (typically, a pattern including four matrixes of 4×4) to constitute the presentation pattern 191 and displays the presentation pattern 191 on a screen as part of the logon authentication screen 197 (step S110).

Then, the user who is to be authenticated generates the one-time password 192 which is a result of applying his/her one-time password deriving rule 102*b* to the presentation pattern 191 by sequentially selecting the pattern elements displayed at specific positions of the presentation pattern 191 displayed on the screen of the authentication request client 151 or inputting characters such as numbers irrelevant to the presentation pattern 191, generates the character string for authentication 192A by putting his/her user ID 102*a* at the user ID embedding position 102*c* determined in advance within the one-time password 192 and inputs the character string for authentication 192A to the authentication request client 151. In other words, the authentication character string input means 156 of the authentication request client 151 accepts input of the character string for authentication 192A (step S111). Then, the authentication character string transmission means 157 of the authentication request client 151 transmits the input character string for authentication 192A to the authentication server 101 (step S112). The authentication character string reception means 107 of the authentication server 101 receives the character string for authentication 192A transmitted from the authentication request client 151 (step S113).

Then, the user authentication means 108 of the authentication server 101 confirms whether a verification code 193 which matches the received character string for authentication 192A exists by sequentially comparing the character string for authentication 192A with the verification codes 193 generated for respective user IDs 102a, and in a case where a verification code 193 which matches the character string for authentication 192A exists, confirms that the user of the user ID 102a corresponding to the verification code 193 is a valid user, and makes user authentication successful (step S114). In a case where the user authentication is successful, the user of the user ID 102a is allowed to receive service in accordance with a utilization form of the user authentication as described below. In other words, in a case of user authentication for allowing the user to use content, and the like, on a Web, the user is allowed to access the content, or allowed to utilize application. In a case of authentication for allowing the user to log on to the Windows domain network, the authentication server 101 transmits the authentication result to the Windows domain controller, and causes the Windows domain controller to allow the user to participate in the Windows network. In a case where the authentication server 101 takes a form of an SSL-VPN gateway, the user is allowed to access the SSL-VPN.

Note that it is also possible to further improve security by hashing data to be transmitted and received in the present invention as appropriate. In other words, the authentication request client 151 can temporarily store the input character string for authentication 192A and can transmit the character string for authentication 192A which is hashed with a hash function to the authentication server 101. The authentication server 101 then compares the received hashed character string for authentication 192A with each hashed verification code 193 which is generated for each user ID 102a and which is hashed with the hash function. In a case where a hashed verification code 193 which matches the received hashed character string for authentication 192A exists, the authentication server 101 can make user authentication for the user ID 102a successful. However, in this case, there is a slight possibility that the hashed verification code may match the hashed character string due to a collision even if the character string for authentication 192A is different from the verification code 193, because the hashed values are compared. To eliminate such a possibility, the following procedure may be additionally executed. In other words, the authentication server 101 transmits the user ID embedding position 102c associated with the user ID 102a corresponding to the verification code 193 and the length of the character string of the user ID 102a to the authentication request client 151 to inquire about the user ID 102a in the character string for authentication 192A. The authentication request client 151 receives these kinds of information, extracts a character string corresponding to the transmitted length of the character string from the user ID embedding position 102c within the input character string for authentication 192A which is temporarily stored, and transmits the character string to the authentication server 101. This character string should correspond to the correct user ID 102a.

The authentication server 101 makes authentication of the user ID 102a successful in a case where the character string obtained through the inquiry matches the user ID 102a corresponding to the verification code 193.

Note that the operation flow described above can be freely changed unless inconsistency such as data which could not have been utilized in a step being utilized in the step, occurs on the operation flow.

The embodiment described above is an example for describing the present invention, and the present invention is not limited to the embodiment. The present invention can be implemented in various forms within the range not deviating from the gist.

The invention claimed is:

1. A user authentication system including at least one CPU programmed to implement:

as a password of a user who is to be authenticated, using a one-time password deriving rule for generating a one-time password by being applied to pattern elements at specific positions, wherein a plurality of pattern elements arranged in a predetermined pattern are presented to the user as a presentation pattern, and authenticate the user on a basis of a character string for authentication in which a user ID is embedded at a predetermined embedding position within the one-time password, wherein the user authentication system comprises an authentication server and an authentication request client;

in advance in association with one another for each said user ID, storing, by the authentication server, the user ID of the user, the one-time password deriving rule of the user, and a user ID embedding position which identifies an embedding position at which the user ID is to be embedded within the one-time password;

generating, by the authentication server, presentation pattern determination information which determines the presentation pattern using a predetermined generation rule;

generating, by the authentication server, a verification code in which the user ID is embedded on a basis of the user ID embedding position, in a result of applying the one-time password deriving rule associated with the user ID to the pattern elements constituting the presentation pattern determined on a basis of the presentation pattern determination information for each said user ID;

transmitting, by the authentication server, the generated presentation pattern determination information to the authentication request client of the user who is to be authenticated;

receiving, by the authentication request client, the presentation pattern determination information transmitted from the authentication server;

determining, by the authentication request client, pattern elements constituting the presentation pattern on a basis of the presentation pattern determination information;

arranging, by the authentication request client, the determined pattern elements in the predetermined pattern to generate a presentation pattern and displaying the presentation pattern on a screen;

accepting, by the authentication request client, input of a character string for authentication in which the user ID is embedded at the user ID embedding position in a one-time password which is a result of applying the one-time password deriving rule to the pattern elements included in the presentation pattern, from the user who is to be authenticated;

transmitting, by the authentication request client, the input character string for authentication to the authentication server;

receiving, by authentication server, the character string for authentication from the authentication request client; and comparing, by the authentication server, the received character string for authentication with the verification code generated for each said user ID and making authentication of the user ID corresponding to the verification code successful when the verification code which matches the received character string for authentication exists.

2. The user authentication system according to claim 1, wherein the presentation pattern determination information is the pattern elements constituting the presentation pattern.

3. The user authentication system according to claim 1, wherein the presentation pattern determination information is a pattern seed value which generates the pattern elements constituting the presentation pattern by being applied to a predetermined pattern element sequence generation rule.

4. The user authentication system according to claim 1, further comprising, when the verification code which matches two or more user IDs exists, repeating, by the authentication server, generation of the verification code for each said user ID on a basis of the presentation pattern determination information newly generated by the authentication server until the verification code which matches two or more user IDs no longer exists.

5. The user authentication system according to claim 4, further comprising:

storing, by the authentication request client, the input character string for authentication, hashes the input character string for authentication with a hash function and transmits the hashed character string for authentication to the authentication server; and comparing, by the authentication server, the received hashed character string for authentication with a hashed verification code obtained by hashing the verification code generated for each said user ID with the hash function, and, when the hashed verification code which matches the received hashed character string for authentication exists, transmits the user ID embedding position corresponding to the verification code to the authentication request client to inquire about the user ID within the character string for authentication, and, when the user ID obtained through the inquiry matches the user ID corresponding to the verification code, makes authentication of the user ID successful.

6. A user authentication method comprising:

as a password of a user who is to be authenticated, using a one-time password deriving rule for generating a one-time password by being applied to pattern elements at specific positions when a plurality of pattern elements arranged in a predetermined pattern are presented to the user as a presentation pattern, and authenticates the user on a basis of a character string for authentication in which a user ID is embedded at a predetermined embedding position within the one-time password, and which is to be executed by an authentication server and an authentication request client;

storing, by the authentication server, the user ID of the user, the one-time password deriving rule of the user, and a user ID embedding position which identifies an embedding position at which the user ID is to be embedded within the one-time password in association with one another in advance for each said user ID;

generating, by the authentication server, presentation pattern determination information which determines the presentation pattern using a predetermined generation rule;

generating, by the authentication server, a verification code obtained in which the user ID is embedded on a basis of the user ID embedding position, in a result of applying the one-time password deriving rule associated with the user ID to the pattern elements constituting the presentation pattern determined on a basis of the presentation pattern determination information for each said user ID;

transmitting, by the authentication server, the generated presentation pattern determination information to the authentication request client of the user who is to be authenticated;

receiving, by the authentication request client, the presentation pattern determination information transmitted from the authentication server;

determining, by the authentication request client, pattern elements constituting the presentation pattern on a basis of the received presentation pattern determination information;

arranging, by the authentication request client, the determined pattern elements in the predetermined pattern to generate a presentation pattern and displaying the presentation pattern on a screen;

accepting, by the authentication request client, input of a character string for authentication in which the user ID is embedded at the user ID embedding position in a one-time password which is a result of applying the one-time password deriving rule to the pattern elements included in the presentation pattern, from the user who is to be authenticated;

transmitting, by the authentication request client, the input character string for authentication to the authentication server;

receiving, by the authentication server, the character string for authentication from the authentication request client; and comparing, by the authentication server, the received character string for authentication with the verification code generated for each said user ID and making authentication of the user ID corresponding to the verification code successful when the verification code which matches the received character string for authentication exists.

7. The user authentication method according to claim 6, wherein the presentation pattern determination information is the pattern elements constituting the presentation pattern.

8. The user authentication method according to claim 6, wherein the presentation pattern determination information is a pattern seed value which generates the pattern elements constituting the presentation pattern by being applied to a predetermined pattern element sequence generation rule.

9. The user authentication method according to claim 6, wherein when the verification code which matches two or more user IDs exists, generating the verification code comprises generation of the verification code for each said user ID on a basis of the presentation pattern determination information newly generated in the step of generating the presentation pattern determination information is repeated until the verification code which matches two or more user IDs no longer exists.

10. The user authentication method according to claim 9, wherein transmitting the input character string for authentication to the authentication server includes storing the input character string for authentication, hashing the input character string for authentication with a hash function and transmitting the hashed character string for authentication to the authentication server, and comparing the received character string for authentication with the verification code generated for each said user ID, and when the verification code which matches the received character string for authentication exists, making authentication of the user ID corresponding to the verification code successful includes comparing the received hashed character string for authentication with a hashed verification code obtained by hashing the verification code generated for each said user ID with the hash function, and when the hashed verification code which matches the received hashed character string for authentication exists, transmitting the user ID embedding position corresponding to the verification code and a length of a character string of the user ID to the authentication request client to inquire about the user ID within the character string for authentication, and when the user ID obtained through the inquiry matches the user ID corresponding to the verification code, making authentication of the user ID successful.

11. An authentication server including at least one CPU programmed to implement:

as a password of a user who is to be authenticated, using a one-time password deriving rule for generating a one-time password by being applied to pattern elements at specific positions when a plurality of pattern elements arranged in a predetermined pattern are presented to the user as a presentation pattern, and authenticate the user on a basis of a character string for authentication in which a user ID is embedded at a predetermined embedding position within the one-time password, and which is connected to an authentication request client;

storing the user ID of the user, the one-time password deriving rule of the user, and a user ID embedding position which identifies an embedding position at which the user ID is to be embedded within the one-time password in association with one another in advance for each said user ID;

generating presentation pattern determination information which determines the presentation pattern using a predetermined generation rule;

generating a verification code in which the user ID is embedded on a basis of the user ID embedding position, in a result of applying the one-time password deriving rule associated with the user ID to the pattern elements constituting the presentation pattern determined on a basis of the presentation pattern determination information for each said user ID;

transmitting the generated presentation pattern determination information to the authentication request client of the user who is to be authenticated;

receiving a character string for authentication in which the user ID is embedded at the user ID embedding position in a one-time password which is a result of applying the one-time password deriving rule to pattern elements included in the presentation pattern determined on a basis of the presentation pattern determination information, transmitted from the authentication request client; and comparing the received character string for authentication with the verification code generated for each said user ID and making authentication of the user ID corresponding to the verification code successful when the verification code which matches the received character string for authentication exists.

12. A user authentication method comprising:

as a password of a user who is to be authenticated, using a one-time password deriving rule for generating a one-time password by being applied to pattern elements at specific positions when a plurality of pattern elements arranged in a predetermined pattern are presented to the user as a presentation pattern, and authenticate the user on a basis of a character string for authentication in which a user ID is embedded at a predetermined embedding position within the one-time password, and which is to be executed by an authentication server connected to an authentication request client;

storing the user ID of the user, the one-time password deriving rule of the user, and a user ID embedding position which identifies an embedding position at which the user ID is to be embedded within the one-time password in association with one another in advance for each said user ID;

generating presentation pattern determination information which determines the presentation pattern using a predetermined generation rule;

generating a verification code in which the user ID is embedded on a basis of the user ID embedding position in a result of applying the one-time password deriving rule associated with the user ID to the pattern elements constituting the presentation pattern determined on a basis of the presentation pattern determination information, for each said user ID;

transmitting the generated presentation pattern determination information to the authentication request client of the user who is to be authenticated;

receiving a character string for authentication in which the user ID is embedded at the user ID embedding position in a one-time password which is a result of applying the one-time password deriving rule to pattern elements included in the presentation pattern determined on a basis of the presentation pattern determination information, transmitted from the authentication request client; and comparing the received character string for authentication with the verification code generated for each said user ID and making authentication of the user ID corresponding to the verification code successful when the verification code which matches the received character string for authentication exists.

* * * * *